US009680947B2

(12) United States Patent
Yao et al.

(10) Patent No.: US 9,680,947 B2
(45) Date of Patent: *Jun. 13, 2017

(54) AGGREGATED ACTIONS

(71) Applicant: Facebook, Inc., Menlo Park, CA (US)

(72) Inventors: Rose Yao, San Francisco, CA (US);
Lincoln Hochberg, Milpitas, CA (US);
Brian Jay Thomas, Redwood City, CA
(US); Naitik H. Shah, Menlo Park, CA
(US); Arthur G. Rudolph, San
Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/136,613

(22) Filed: Apr. 22, 2016

(65) Prior Publication Data
US 2016/0241655 A1 Aug. 18, 2016

Related U.S. Application Data

(63) Continuation of application No. 14/142,076, filed on Dec. 27, 2013, now Pat. No. 9,349,020.

(51) Int. Cl.
G06F 3/00 (2006.01)
H04L 29/08 (2006.01)
G06F 21/62 (2013.01)
H04L 29/06 (2006.01)

(52) U.S. Cl.
CPC .......... H04L 67/22 (2013.01); G06F 21/6218 (2013.01); H04L 63/102 (2013.01); H04L 65/403 (2013.01); H04L 67/306 (2013.01)

(58) Field of Classification Search
CPC ............ G06F 21/6218; G06F 2216/03; G06F 17/30017; G06F 3/04817; G06F 3/0482; H04L 65/403; G06K 9/00711; G06N 5/025; H04N 5/147; H04N 21/4126
USPC ............................................ 726/27; 715/753
See application file for complete search history.

(56) References Cited

U.S. PATENT DOCUMENTS

| 8,521,787 B2 * | 8/2013 | Bosworth | G06F 17/3089 707/802 |
| 9,094,360 B1 * | 7/2015 | Bapat | H04L 51/32 |
| 2010/0132049 A1 * | 5/2010 | Vernal | G06F 21/6245 726/27 |
| 2011/0029612 A1 * | 2/2011 | Bosworth | G06F 17/3089 709/204 |

(Continued)

Primary Examiner — Joseph P Hirl
Assistant Examiner — Sayed Beheshti Shirazi
(74) Attorney, Agent, or Firm — Nicholson De Vos Webster & Elliott LLP

(57) ABSTRACT

Exemplary methods, apparatuses, and systems receive a first plurality of actions from a first entity with respect to a first plurality of objects. A global object related to each of the first plurality of objects is determined and a representation of the global object is displayed in association with a representation of the first entity. Additionally, in response to receiving user feedback on the representation of the global object displayed in association with the representation of the first entity, an instance of the global object that is unique to the first entity is created. The displayed representation of the global object is converted into a representation of the instance of the global object that is unique to the first entity.

20 Claims, 6 Drawing Sheets

(56) References Cited

U.S. PATENT DOCUMENTS

| | | | |
|---|---|---|---|
| 2011/0137932 A1* | 6/2011 | Wable | G06F 17/30867 |
| | | | 707/769 |
| 2011/0238755 A1* | 9/2011 | Khan | G06Q 50/01 |
| | | | 709/204 |
| 2013/0013668 A1* | 1/2013 | Kodaka | H04L 67/1004 |
| | | | 709/203 |
| 2013/0073400 A1* | 3/2013 | Heath | G06Q 30/02 |
| | | | 705/14.73 |
| 2013/0073473 A1* | 3/2013 | Heath | G06Q 30/02 |
| | | | 705/319 |
| 2013/0159413 A1* | 6/2013 | Davis | H04L 29/0872 |
| | | | 709/204 |
| 2013/0212491 A1* | 8/2013 | Yerli | H04L 51/32 |
| | | | 715/753 |
| 2014/0280565 A1* | 9/2014 | Grewal | H04L 67/306 |
| | | | 709/204 |

* cited by examiner

AGGREGATED ACTIONS

CROSS-REFERENCE TO RELATED APPLICATIONS

This application is a continuation of U.S. application Ser. No. 14/142,076, filed Dec. 27, 2013, which is hereby incorporated by reference.

FIELD

The various embodiments described herein relate aggregating user actions within a social network. Additionally, the embodiments relate to user feedback on representations of aggregated actions within a social network.

BACKGROUND

Network services enable users to interact with various objects. For example, a social networking system allows users to designate other users or entities as connections (or otherwise connect to, or form relationships with, other users or entities), contribute and interact with their connections, post media or commentary, use applications, join groups, list and confirm attendance at events, invite connections, and perform other tasks that facilitate social interaction. External applications also use the services of a social networking system to allow authenticated users to incorporate some of the above social interactions with use of the external applications. Similar interactions are a part of the user experience within other network services.

Representations of these user interactions are displayed in a graphical user interface, e.g., in the form of a user, the user's action, and an object the user has acted upon. Other users create feedback with regard to these user interactions within the social networking system. For example, a first user may take an action indicate that she listened to a song. A second user may see a representation of the first user's action and indicate that the second user likes that the first user listened to the song. The second user's feedback is specific to the first user's action, in contrast to the second user generally liking the song, the artist singing the song, etc.

SUMMARY OF THE DESCRIPTION

Exemplary methods, apparatuses, and systems aggregate a plurality of actions received directly or indirectly from a first entity to determine a common global object related to each of the objects acted upon. A representation of the global object is displayed in association with a representation of the first entity.

For example, the first user of a social network may use a software application to listen to multiple songs by a particular band. The software, in turn, transmits messages to a social networking system indicating that the first user performed an action, listening, to the songs. In response, the social networking system determines that each of the songs is attributed to the band and that the band is represented by a global object within the social networking system. A profile (or other publication) of the first user's interests is modified to display that the first user is interested in the band without the first user submitting a request to add the band to the profile.

In addition to displaying the global object as an interest of the first entity, the social networking system enables other entities to leave feedback for the first entity regarding the interest in the subject of the global object. For example, a second user of the social network may want to leave a comment or another form of feedback on the first user's interest the global object. This is in contrast to the second user leaving feedback directly on the global object, regardless of the first entity's interest.

In response to receiving user feedback on the representation of the global object displayed in association with the representation of the first entity, "relationship object" is created as an instance of the global object that is unique to the first entity. Fore example, the displayed representation of the global object is converted into a representation of the relationship object. As a result, the received feedback is specific to the first entity's interest in the subject of the global object and not feedback for the global object generally.

In one embodiment, creating the relationship object includes applying a selection algorithm to select a device to create the relationship object. As a result, embodiments avoid race conditions resulting from multiple devices trying to simultaneously create the relationship object. The selection algorithm provides all devices within the social networking system a consistent method to select the same device to create the relationship object unique to the first entity. For example, the selection algorithm may include selecting the server or database that stores the representation of the first entity.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments described herein create associations between a user and objects in various categories. A user may manually select an object, such as music album, and add it to a displayed collection of music the user likes. Additionally, embodiments automatically select an object in response to actions related to that object. For example, multiple user actions within in a social network are aggregated to find a commonality between the objects acted upon. A global object representing the commonality is displayed in association with the entity. This representation of the aggregated actions, however, is a representation of a global object that is not unique to the first entity. As a result, when user feedback is received for the representation of the global object, "relationship object" is created as an instance of the global object that is unique to the first entity is created.

Figure 1:
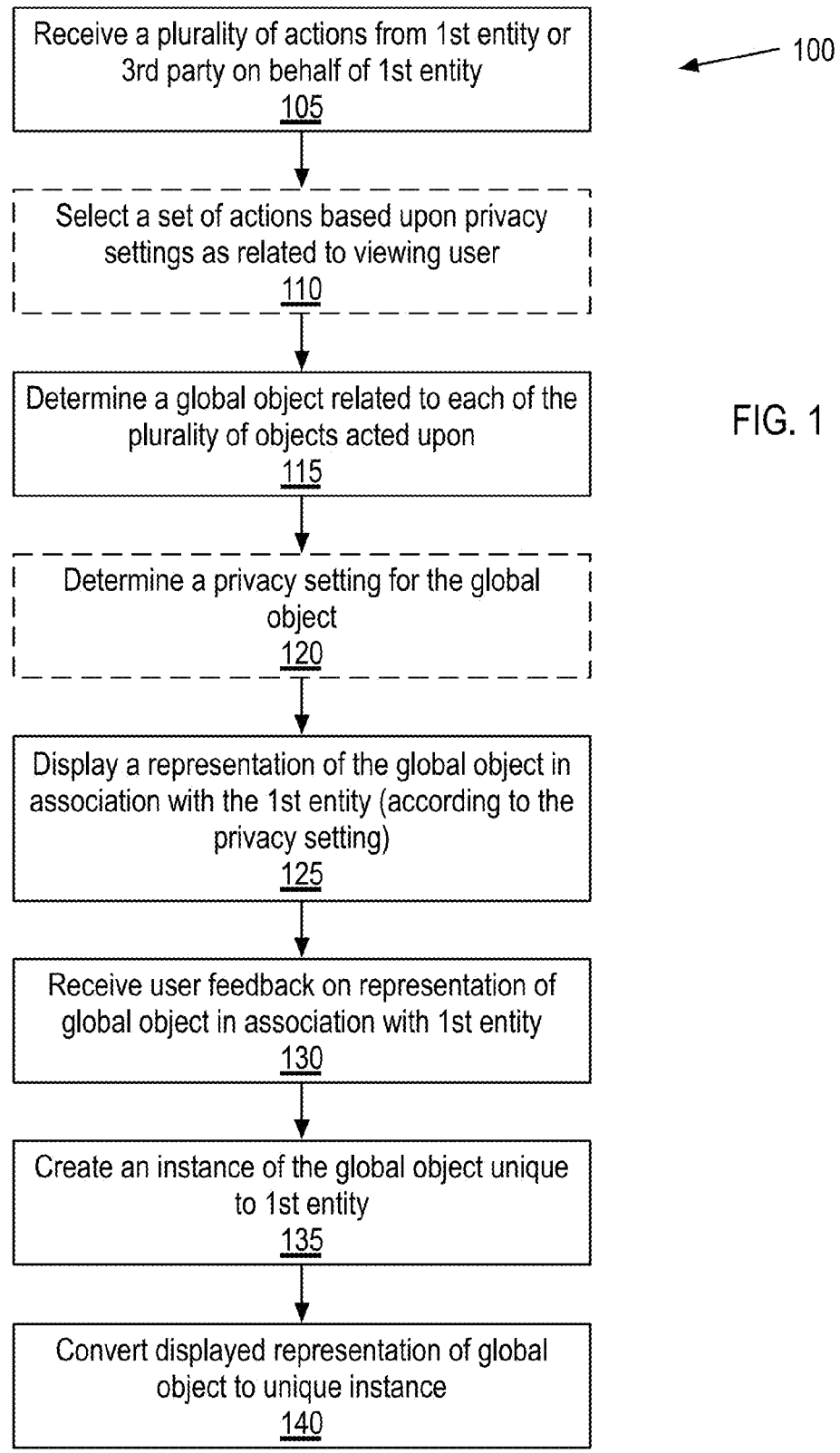
FIG. 1 is a flow chart illustrating an exemplary method of facilitating user feedback on representations of aggregated actions.

FIG. 1 is a flow chart illustrating exemplary method 100 of facilitating user feedback on representations of aggregated actions. At block 105, a social networking system receives a first plurality of actions from a first entity with respect to a first plurality of objects. In one embodiment, the first entity is a single user of the social networking system. Alternatively, the first entity represents a plurality of users (e.g., a defined group within the social networking system). Exemplary actions include the first entity designating other users or entities as connections (or otherwise connect to, or form relationships with, other users or entities), contributing and interacting with their connections, posting media or commentary, using applications, joining groups, listing and confirming attendance at events, inviting connections, and performing other tasks that facilitate social interaction. The social networking system receives the first plurality of actions directly from user action within the social networking system and/or via a third party application or website. The first plurality of actions may be a subset of a greater number of actions taken by the first entity. The social networking system may limit the first plurality of actions to period of time, actions performed through one or more specific applications/interfaces, actions that have not been previously aggregated, etc. In one embodiment, actions within the social network are stored or otherwise represented in a graph of social network data.

Figure 2:
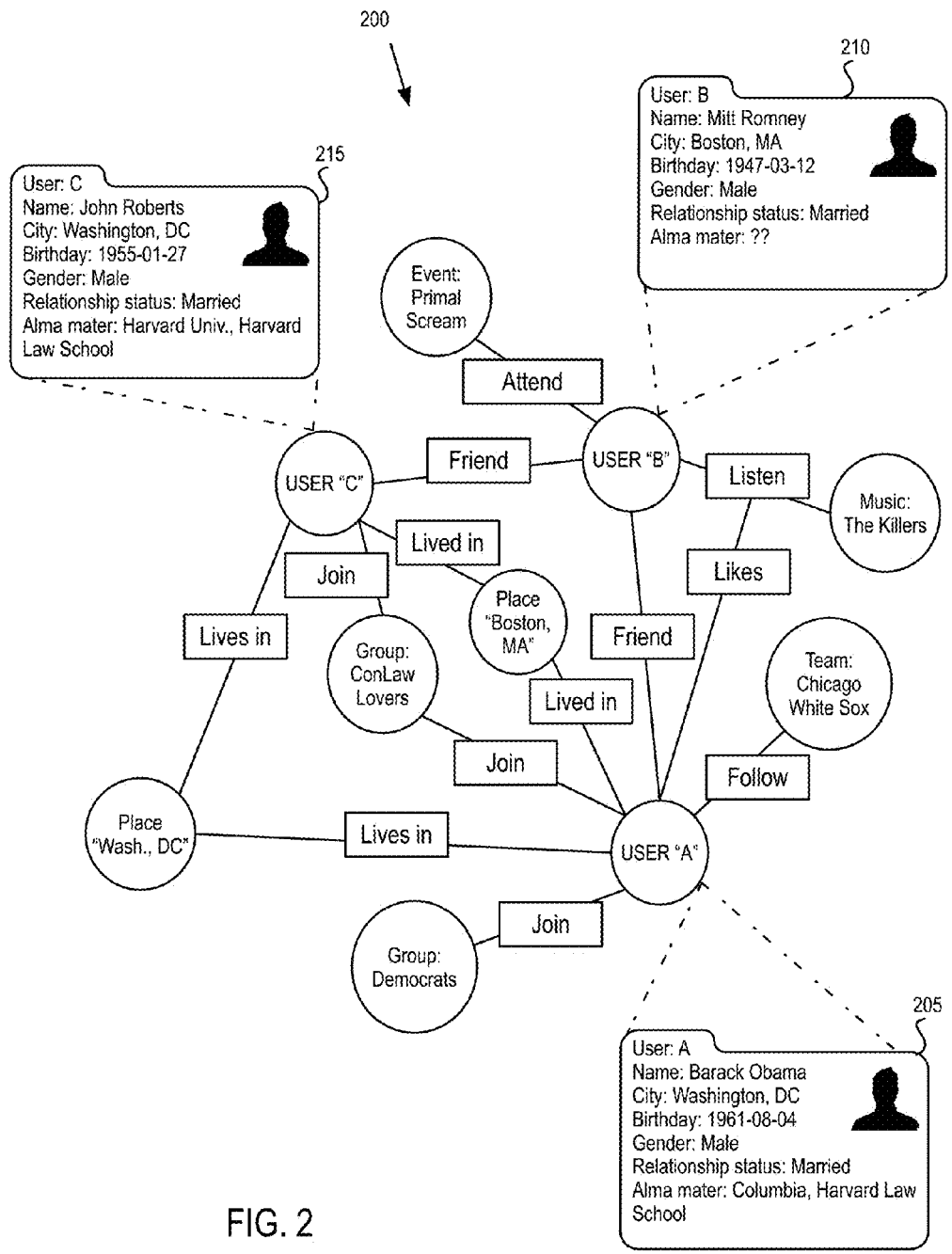
FIG. 2 illustrates an exemplary graph of user actions with respect to objects within the social network.

FIG. 2 illustrates exemplary graph 200 of social network data. In graph 200, objects are illustrated as circles and actions are illustrated as labeled connections between circles. Developers of the social network or corresponding social network applications define actions to represent different ways that users may interact with the social network and/or their applications. As users perform actions, connections are made between users and objects. For example, User A has performed a number of actions within the social network, indicating that he previously lived in Boston, currently lives in Washington D.C., joined groups for Democrats and ConLaw Lovers, is following the White Sox, and is friends with User B. User B and User C have also performed a number of actions with respect to objects within graph 200.

In one embodiment, users are able to provide feedback on actions of other users/entities. As a result, actions are also viewed as objects that may be acted upon. For example, User B listened to music by the artist, The Killers. As a result, the social networking system publishes a narrative associated with User B (e.g., in a newsfeed, profile of User B, etc.) indicating that User B listened to music by the artist, The Killers. In viewing a newsfeed, profile of User B, or another form of social networking system publication(s), the social networking system displays the narrative to User A. The social networking system then receives input from User A indicating that User A "likes" that User B listened to The Killers.

In one embodiment, information may be added to user profiles 205-215. In one embodiment, the user profiles 205-210 include information, such as relationships to other users, places where the user has worked, user interests, etc. In one embodiment, information further includes a weight or score indicating an affinity between a user and an object. For example, repeated user action with one object may indicate a stronger affinity for that object than another object with which the user has limited interaction. First degree connections, e.g., the friendship between User A and User B, may indicate a stronger affinity than second degree connections, e.g., User A is friends with User B, who is friends with User C, creating a second degree connection between User A and User C. An indication that two users are married may indicate a stronger affinity between those users than if two users are friends. Additionally, temporal and geographic proximity of actions/users are other exemplary indicators of affinity.

The illustrated objects and actions are exemplary social networking data used as the plurality of actions described above. In one embodiment, users may select privacy settings to control what network service data is shared, with whom the data is shared, and/or what data used for aggregation.

Returning to FIG. 1, at block 110, the social networking system optionally selects a set of the received actions based upon privacy settings designating what actions by the first entity are shared with a user seeking to view the first entity's aggregated actions. In other words, the actions that social networking system aggregates are dependent upon a user attempting to view aggregated actions. As a result, the social networking system may create different aggregated actions for the first entity based upon different viewing users. For example, the first entity may have taken one or more actions with a "public" privacy setting and one or more actions with a "friends only" privacy setting. If a user requesting to view aggregated actions of the first entity is not friends with the first entity, the user will not have permission to view the actions with the friends only privacy setting and the social networking system will aggregate only those actions with the public privacy setting. If another user requesting to view aggregated actions of the first entity is friends with the first entity, the social networking system will aggregate both the actions with the public privacy setting and the actions with the friends only privacy setting. While described with reference to public and friends only settings, privacy settings may include additional levels of privacy. For example, the first entity may create privacy settings permitting actions to be viewed by designated users, users based upon affinity or degrees of connectedness, groups, entities, etc.

At block 115, the social networking system aggregates the first entity's actions by determining a global object related to each of the first plurality of objects. For example, for each action performed by the first entity and transmitted to the social networking system, the social networking system compares metadata stored for an object that is the subject of the received action. Exemplary metadata includes names of artists, actors, directors, authors, composers; titles of songs, albums, television shows, books, movies; genres of music, movies, television shows, books; sports teams, geographic locations, and other data that describes an object of interest. If the action included the first entity listening to a song, the social networking system would determine metadata associated with the song includes the artist/band that performs the song. The social networking system would then compare the artist/band against metadata of other subjects acted upon by the first entity. In one embodiment, the social networking system limits comparisons of metadata to objects acted upon within a threshold period of time.

In one embodiment, the social networking system determines if the metadata has a representative global object within the social network. In one embodiment, the social networking system aggregates multiple actions and determines one or more characteristics of interest/types of metadata that the objects acted upon have in common. For example, the social networking system may store a list of types of metadata (such as artists, bands, and albums) that, when found in common between objects, trigger a search for a representative global object.

In one embodiment, the social networking system maintains a list of items of metadata that have corresponding global objects within the social networking system. If the first entity acts upon multiple objects that have an item of metadata in common that is included in the list, the social networking system selects the corresponding global object. For example, the social networking system may curate a list of candidate global objects that serve as metadata for other objects and correspond to categories of interest shared within the social network, trending topics/subjects, etc.

Figure 3:
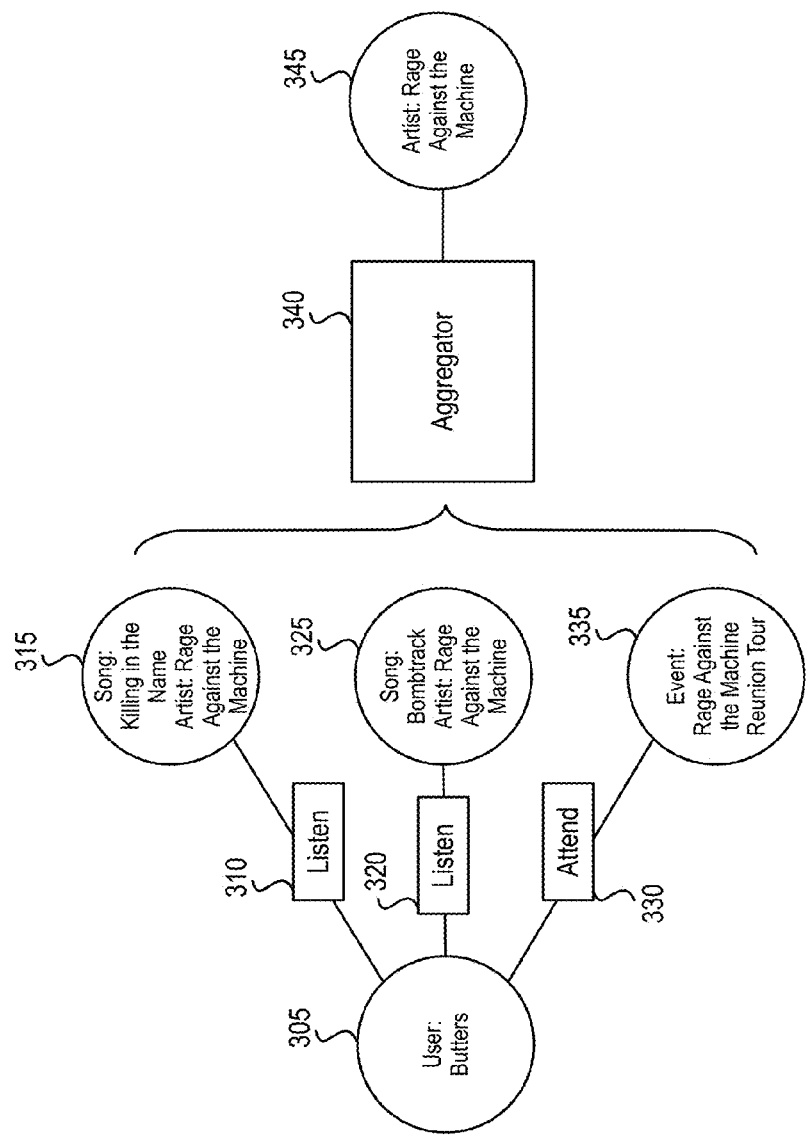
FIG. 3 illustrates an exemplary aggregation of user actions.

FIG. 3 illustrates an exemplary aggregation of user actions. In the illustrated example, the social networking system aggregates three actions of a user, Butters 305. Butters 305 listened 310 to song 315 titled Killing in the Name and by the artist Rage Against the Machine. Butters 305 also listened 320 to song 325 entitled Bombtrack and by Rage Against the Machine. Butters 305 further attended 330 event 335, a Rage Against the Machine Reunion Tour concert. Assuming that the social networking system is not using privacy settings to determine which actions to aggregate or that a viewing user has permission to view each of actions 310, 320, and 330, aggregator 340 determines that each object 315, 325, and 335 includes a common metadata item, the artist Rage Against the Machine. In one embodiment, aggregator 340 determines that a musical artist is an interesting characteristic, e.g., by referencing a stored listing of characteristics. As described above, interesting characteristics may include specific metadata items, such as a particular musician, or metadata types, such as names of musicians generally. Aggregator 340 further selects a global object that represents the common characteristic, e.g., Rage Against the Machine. In response to determining the common characteristic, aggregator 340 displays the representation 345 of the global object in association with a representation of the first entity within the social networking system. For example, aggregator 340 alters a portion of the social networking system that represents Butters' interests to include music by Rage Against the Machine 345. As a result, a user seeking to view the Butters' aggregated actions and meeting the corresponding privacy settings (as described with reference to block 110 above or block 120 below) will see a display of global object 345 for Rage Against the Machine.

In one embodiment, the social networking system groups the interests of the first entity into one more collections. Exemplary collections include interests in music, movies, television shows, books, places, fashion, sports, etc. As a result of the aggregation, global object 345 for Rage Against the Machine may be displayed in a collection of music displayed on a profile page for Butters 305.

In one embodiment, aggregator 340 determines multiple interesting characteristics from the first entity's actions. For example, aggregator 340 may further determine that each object 315, 325, and 335 includes another common metadata item, such as a particular album by the artist/band Rage Against the Machine. As a result, aggregator 340 may generate a second global object for the album (not shown). Alternatively, aggregator 340 may select one of the two possible global objects based upon priority. For example, the stored listing of characteristics may further rank characteristics by priority. Returning to FIG. 1, at block 120, the social networking system optionally determines a privacy setting for the global object resulting from the aggregated actions. If all of the aggregated actions have a single privacy setting, the resulting global object (as displayed in association with the first entity) will also have the same privacy setting. If, however, one or more of the aggregated actions have a different privacy setting, the social networking system will select a privacy setting based upon the privacy settings of the aggregated actions. For example, referring to FIG. 3, if the actions, listen 310 and listen 320, were set to a first privacy setting and the action, attend 330, was set to a second privacy setting, the social networking system would select either the first or second privacy setting for global object 345. In one embodiment, the social networking system selects the most restrictive privacy setting. Continuing with the example above, if the first privacy setting for listen 310 and listen 320 is "public" and the second privacy setting for attend 330 is "friends only," the social networking system assigns global object 345 to the more restrictive, "friends only" privacy setting.

In one embodiment, the social networking system selects the most recent privacy setting. For example, if the privacy setting for listen actions is changed such that listen 310 occurs when the setting is "friends only" and listen 320 occurs when the setting is "public," and the privacy setting for attend 330 has a "public" privacy setting, the social networking system determines that the first entity's most recent action (listen 320) corresponds to "public" and assigns global object 345 to the "public" privacy setting.

In one embodiment, the social networking system's determination of which privacy setting to use for the global object is dependent upon the actions with differing privacy settings. For example, users may designate privacy settings based upon action type or application. Listen 310 and listen 320 are individual actions of the "listen" action type. If multiple actions of a single type that typically have a single privacy setting (such as listen 310 and listen 320) have different privacy settings due to the first entity changing the privacy setting between actions, the social networking system selects the privacy setting based upon the most recent privacy setting. If the actions are of different types with unique privacy settings (and are not necessarily different due to the first entity changing the privacy setting between actions), the social networking system selects the more restrictive privacy setting. In one embodiment, the first entity may be prompted to or elect to set or change the privacy setting for the global object.

In one embodiment, the first entity selects a privacy setting for the global object. For example, the social networking system may initially display the global object using the privacy policy of the most recent action in the aggregated group of actions. At this point, the privacy policy is ephemeral, i.e., the privacy policy is not stored with the global object. If the first entity elects to manually set the privacy policy of the global object, the manual privacy policy setting is stored with the global object and the social networking system uses the stored (manual) privacy policy for the global object thereafter.

In an embodiment in which privacy settings were utilized to select actions for aggregation, as described with reference to block 110, it is unnecessary to determine a privacy setting for the global object. As a result, the social networking system may proceed directly to block 125.

At block 125, the social networking system displays to the viewing user a representation of the global object in association with the first entity. For example, the social networking system may display interests of the first entity within a profile page for the first entity or in another form of publication, such as the first entity's interests in artists, music, movies, television shows, books, places, fashion, sports, etc. One of the interests is represented as the global object that results from the aggregation of actions described above. As described above, the display of the global object may be subject to one or more privacy settings.

While displayed in association with the first entity, the global object is a global representation that is not unique to the first entity. For example, global object 345 is a global representation of the artist, Rage Against the Machine. The global representation of Rage Against the Machine is an object in the social graph representing the entity, Rage Against the Machine. Additionally, albums and songs by Rage Against the Machine may each be represented as objects within the social graph. Butters 305, however, has not taken a unique action with respect to Rage Against the Machine to manually add Rage Against the Machine to an interests portion of his profile page. For example, Butters has not specifically "liked" or otherwise performed an action that would ordinarily result in Rage Against the Machine being added to the interests displayed on a profile page for Butters 305. Instead, Butters 305 has listened 310/320 to music by Rage Against the Machine and attended 330 a Rage Against the Machine concert. The association of the global object for the artist, Rage Against the Machine 345, is based upon an aggregation of actions 310, 320, 330 and the determination of an interesting, common attribute. As a result, the displayed global object 345 does not include a "user, action, object acted upon" relationship that results from the individual actions that are aggregated. For example, the user (Butters 305) acted upon (listened 310) an object (the song, Killing in the Name by Rage Against the Machine 315). There is a distinct relationship between Butters 305 and Killing in the Name 315 defined by Butters 305 listening to that song. Other users are able to view and generate feedback on this relationship. This feedback is unique to the action/relationship between Butters 305 and Killing in the Name 315, as opposed to the other user taking his/her own action with respect to Killing in the Name 315. The association between global object 345 and Butters 305, however, does not (yet) include an explicit action upon which a viewing user may provide feedback.

In one embodiment, the social networking system displays the global object in association with the first entity for a limited amount of time. Given that the first entity did not explicitly take an action with respect to the global object, the association between the first entity and the global object is temporary unless the global object is converted into a unique object (e.g., as described below). In one embodiment, the limited amount of time is extended if the social networking system aggregates additional actions by the first entity and determines that the global object is related to the additional actions.

At block 130, the social networking system receives user feedback on the representation of the global object displayed in association with the representation of the first entity. For example, referring again to FIG. 3, the social networking system displays global object 345 to a user viewing a social networking profile, timeline, or other data for Butters 305. To let Butters 305 know what the viewing user thinks of Butters' interest in Rage Against the Machine, the viewing user selects an option to like, comment on, or leave another form of feedback on the displayed global object.

At block 135, the social networking system creates a relationship object that is an instance of the global object (or the first entity's relationship with the global object) that is unique to the first entity in response to the received user feedback. As described above, the global object is not unique to the first entity and the first entity has not taken an explicit action with respect to the first entity to the global object. Without the relationship object, the viewing user's feedback may be unintentionally directed to the global object itself, rather than a relationship between the first entity and the global object. As a result, the social networking system creates the relationship object to enable user feedback on the aggregation of the first entity's actions. For example, the social networking system may create a copy of the global object with metadata indicating the relationship between the first entity and the object.

In one embodiment, the social networking system applies a selection algorithm to select a device to create the relationship object. If multiple users were to attempt to leave feedback on the representation of the global object displayed in association with the representation of the first entity within the same period of time, it is possible that multiple servers within the social networking system would attempt to simultaneously create the unique relationship object. This race condition will likely cause an error (e.g., the feedback from a user may be created and erased by feedback from another user). As a result, the social networking system utilizes a selection algorithm to provide all devices within the social networking system with a consistent method to select the same single device to create the relationship object. If all devices that receive feedback on the representation of the global object direct the request to create a unique instance to the same device, that single device can prevent race conditions or at least enable a device to generate/receive an error message when the request fails. In one embodiment, the selection algorithm includes selecting the server or database storing the representation of the first entity. Alternatively, the selection algorithm includes selecting another server or database designated for the purpose of creating unique instances of a particular global object, using a hash algorithm on the global object, or another method to enable devices to consistently select the same device.

At block 140, the social networking system converts the displayed representation of the global object to a relationship object that is unique to the first entity (or a unique object representing the relationship between the first entity and the global object). The relationship object conveys the same information as the global object and further enables feedback unique to the first entity. As described above, the global object may be associated with the first entity for a limited period of time. In one embodiment, the relationship object is associated with the first entity for a period of time is greater than the limited period time for the global object. For example, the relationship object may become a persistent object stored in the social graph.

In one embodiment, the relationship object is displayed with the privacy setting determined in block 120. In one embodiment, the display of this privacy setting is dependent upon the underlying privacy settings for individual actions. If the plurality of actions has a homogenous privacy setting, the privacy setting for the unique relationship object is displayed as a discrete privacy setting. If, however, the actions have heterogeneous privacy settings (i.e., a combination of different privacy settings), the privacy setting for the unique relationship object is displayed as a link to the individual actions, a link to the individual privacy settings, or otherwise represent a heterogeneous mix of privacy settings.

While method 100 is described above with reference to a single set of actions and corresponding global object, the social networking system may process multiple sets of actions (comprised of overlapping or unique actions, objects, and/or action-object pairings) and determine global objects associated with each set of actions. In one embodiment, the social networking system receives a second plurality of actions from the first entity with respect to a second plurality of objects within the social networking system. Similar to the description above, the social networking system determines a second global object related to each of the second plurality of objects. The social networking system may further determine that the second global object is the same as the global object that the social networking system determined to be related to the first plurality of objects. For example, the social networking system may search the temporarily stored representations of the relationship between the first entity and global objects. Additionally, the social networking system may search for a stored relationship object that is unique to the first entity. For example, the social networking system may search the metadata of relationship objects for an indication of the created relationship.

As a result the search for the global/relationship object, the social networking system determines that the association between the first entity and the global object has previously been created and avoids creating a duplicate association. In response to the second determination of the global object's association with objects acted upon by the first entity, the social networking system extends the limited period of time the global object is associated with the first entity (e.g., if the representation of the global object has not be converted into a relationship object).

Figure 4:
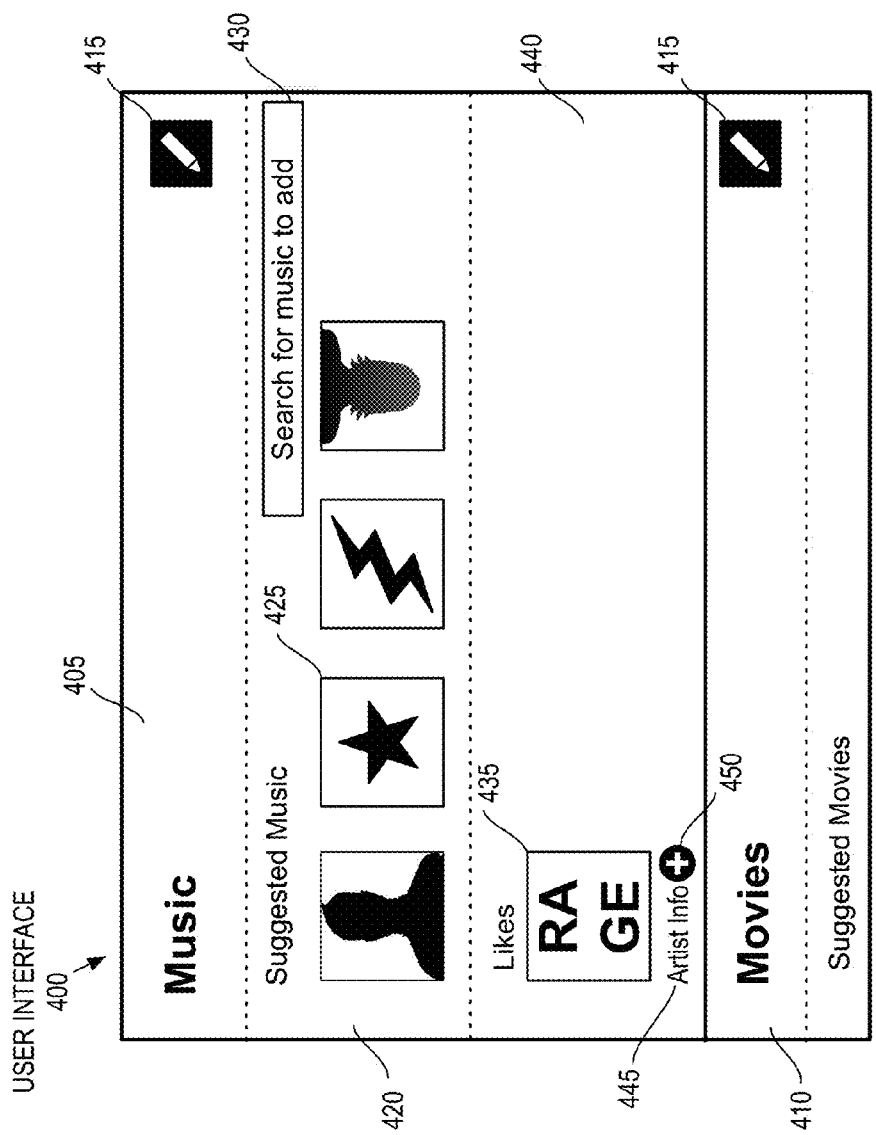
FIG. 4 illustrates an exemplary user interface displaying a representation of aggregated user actions.

FIG. 4 illustrates exemplary user interface 400 displaying objects representing interests of a first entity. User interface 400 includes a collection of music 405 and a collection of movies 410 representing, respectively, the entity's expressed or aggregated interest in music and film. While the examples described herein focus on an entity's interest in music, other collections of interests may also be displayed. For example, entity actions at a particular stadium or sports events may be aggregated to determine the entity's interest in a sports team, entity actions at various locations of interest in a city may be aggregated to determine the entity's interest in the city, entity actions expressing interest in individual items of clothing by a particular designer may be aggregated to determine the entity's interest in the designer, etc.

User interface 400 may be presented in a different manner depending upon the viewer. For example, when the entity represented by the interests displayed is viewing user interface 400, the entity may be presented with user interface elements to control or change the content displayed and/or shared with others. When viewed by the entity, each collection 405/410 includes an interface element 415 to enable the entity to edit privacy settings for the corresponding collection. Additionally, user interface 400 includes a suggestion area 420 that includes music 425 (by album, artist, etc.) recommendations from which the first entity may select and add to "liked" music area 440. In one embodiment, the suggestion area 420 includes a search box 430 to enable the first entity to search for music to add to "liked" music area 440 of music collection 405.

Music collection 405 includes global/relationship object 435 within the "liked" music area 440. In contrast to music that the first entity may add using suggested music area 420, global/relationship object 435 is displayed in area 420 of music collection 405 as a result of aggregation (as described above). Global/relationship object 435 is displayed with artist information 445. In one embodiment, artist information 445 provides a link to a profile page or other webpage for the artist/band represented by the global/relationship object 435. Additionally, another interface element (not shown) may be displayed to the first entity along with global/relationship object 435 to enable the entity to edit privacy settings for that individual object 435.

When a second entity views user interface 400, the second entity is presented music collection 405 with "liked" music 440 displaying global/relationship object 435. User interface 400, however, would not display recommendation area 420 or privacy control element 415 to the second entity. In proximity to global/relationship object 435, user interface 400 includes feedback interface object 450. In one embodiment, the second entity's selection of feedback interface object 450 triggers the social networking system to generate a feedback action (e.g., the second entity likes the first entity's interest in Rage Against the Machine as represented by global/relationship object 435). Alternatively, the second entity's selection of feedback interface object 450 triggers the social networking system to open a dialogue box or otherwise provide the second entity with options for generating similar feedback (e.g., leaving a comment). As described above, such feedback may cause the social networking system to convert a representation of a global object 435 into a relationship object 435 specific to the first entity.

Figure 5:
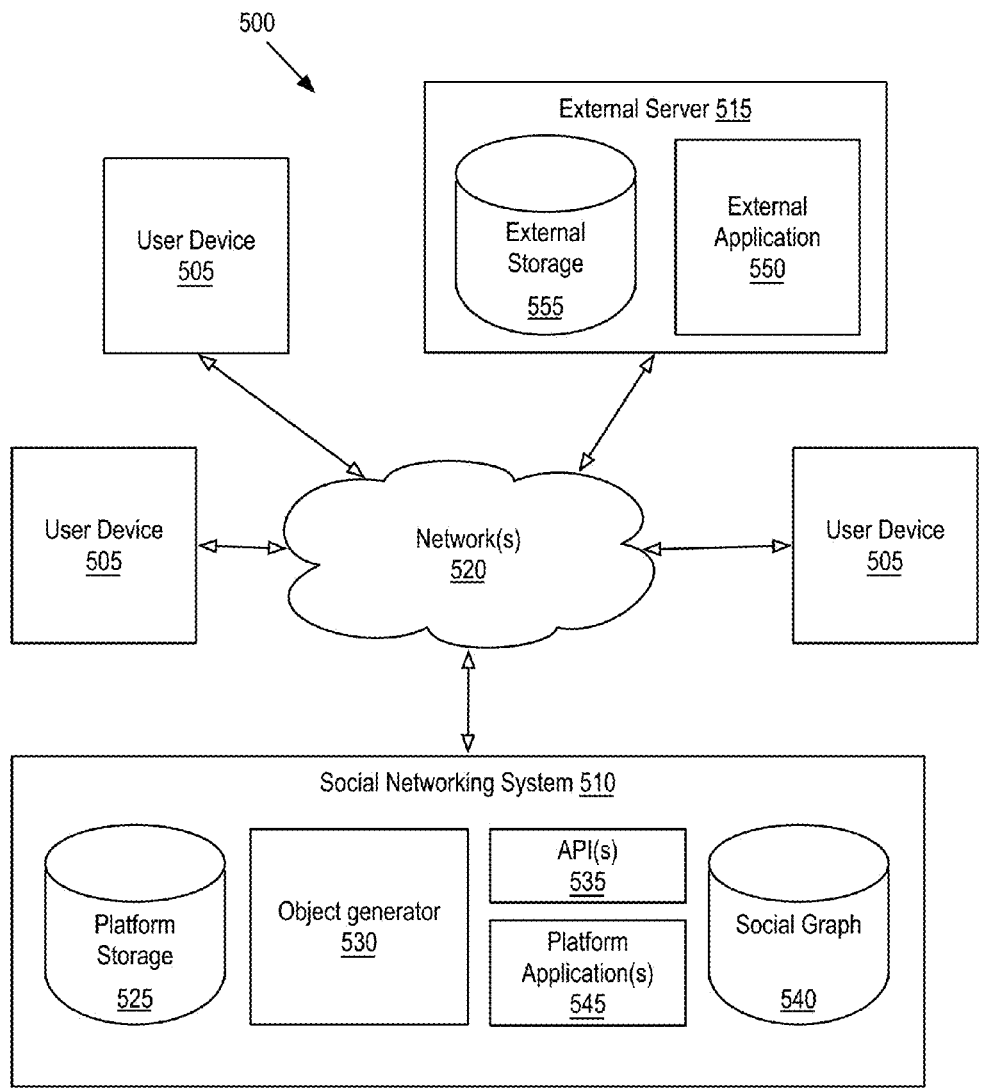
FIG. 5 illustrates, in block diagram form, an exemplary social network.

FIG. 5 illustrates, in block diagram form, an exemplary network service 500, such as a social network to facilitate feedback on aggregated actions. Social network 500 includes user devices 505, social networking system 510, and external server 515 coupled to one or more networks 520. A user interacts with the social networking system 510 using a user device 505, such as a personal computer or a mobile phone. For example, the user device 505 communicates with the social networking system 510 via an application such as a web browser or native application. Typical interactions between the user device 505 and the social networking system 510 include operations such as viewing profiles of other users of the social networking system 510, contributing and interacting with media items, joining groups, listing and confirming attendance at events, checking in at locations, liking certain pages/posts, creating pages, and performing other tasks that facilitate social interaction, as described herein.

The social networking system 510 includes platform storage 525, an aggregator and/or object generator 530, one or more application programming interfaces (API's) 535, a social graph 540 (e.g., as illustrated in FIG. 3), and one or more platform applications 545. Platform storage 525 stores user preferences/settings, profile data, interaction data, object metadata, demographic data, etc. Exemplary platform applications 545 include the platform for social interactions (e.g., publishing posts, pictures, etc.) as well as social games, messaging services, and any other application that uses the social platform provided by the social networking system 510. While illustrated as a single block, social networking system 510 may include a plurality of servers and/or data stores.

In one embodiment, the object generator 530 and/or a platform application 545 perform method 100 described above. Interaction data, object metadata, demographic data, associations between entities and objects, etc. is received from platform storage 525 and/or the social graph 540, and the mappings are stored in platform storage 525. Alternatively, one or more of the method and/or data is performed/stored external to the social networking system 510.

One or more API's 535 enable external applications 550 to work with the social networking system 510. For example, an external application 550 utilizes an API 535 to authenticate a user based upon the user's social networking log in username and password. Additionally, an external application 550 utilizes one or more API's 535 to run the application within the platform application 545, to publish a post to the platform application 545, to access the user's social network connections within the social graph 540, etc. In one embodiment, an external application 550 performs method 100 and data is received from and/or stored in one or both of external storage 555 or in platform storage 525.

Figure 6:
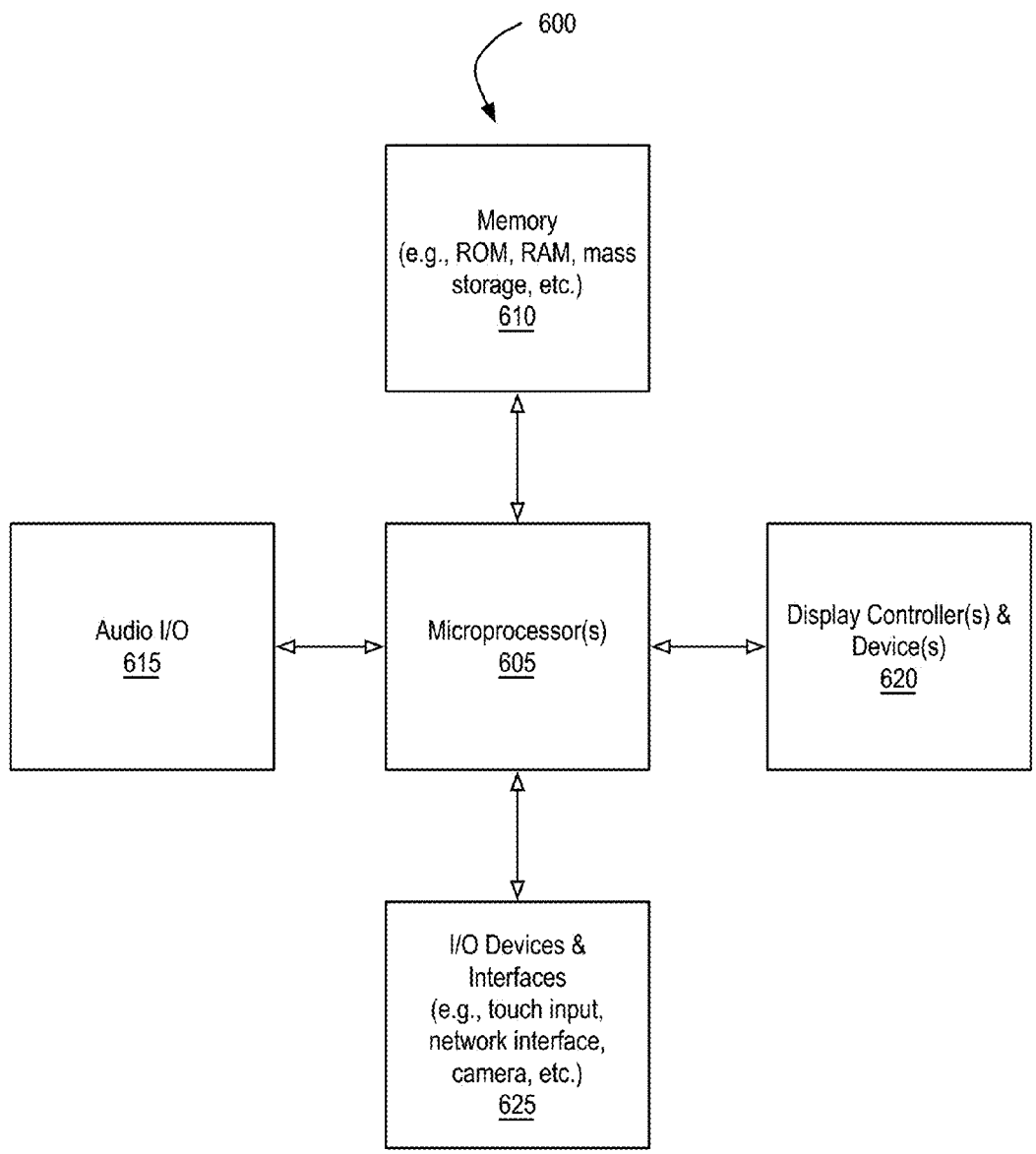
FIG. 6 illustrates, in block diagram form, an exemplary processing system to facilitate user feedback on representations of aggregated actions.

FIG. 6 illustrates, in block diagram form, an exemplary processing system 600 to facilitate user feedback on representations of aggregated actions. Data processing system 600 includes one or more microprocessors 605 and connected system components (e.g., multiple connected chips). Alternatively, the data processing system 600 is a system on a chip.

The data processing system 600 includes memory 610, which is coupled to the microprocessor(s) 605. The memory 610 may be used for storing data, metadata, and programs for execution by the microprocessor(s) 605. The memory 610 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 610 may be internal or distributed memory.

The data processing system 600 also includes an audio input/output subsystem 615 which may include a microphone and/or a speaker for, for example, playing back music or other audio, receiving voice instructions to be executed by the microprocessor(s) 605, playing audio notifications, etc. A display controller and display device 620 provides a visual user interface for the user.

The data processing system 600 also includes one or more input or output ("I/O") devices and interfaces 625, which are provided to allow a user to provide input to, receive output from, and otherwise transfer data to and from the system. These I/O devices 625 may include a mouse, keypad or a keyboard, a touch panel or a multi-touch input panel, camera, optical scanner, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 600.

The I/O devices and interfaces 625 may also include a connector for a dock or a connector for a USB interface, FireWire, Thunderbolt, Ethernet, etc. to connect the system 600 with another device, external component, or a network. Exemplary I/O devices and interfaces 625 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect the data processing system 600 with another device, external component, or a network and receive stored instructions, data, tokens, etc.

It will be appreciated that one or more buses, may be used to interconnect the various components shown in FIG. 6.

The data processing system 600 is an exemplary representation of one or more of user's device 505, at least a portion of the social networking system 510, or the external server 515. The data processing system 600 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, the data processing system 600 may be a network computer, server, or an embedded processing device within another device or consumer electronic product. As used herein, the terms computer, device, system, processing system, processing device, and "apparatus comprising a processing device" may be used interchangeably with the data processing system 600 and include the above-listed exemplary embodiments.

It will be appreciated that additional components, not shown, may also be part of the system 600, and, in certain embodiments, fewer components than that shown in FIG. 6 may also be used in a data processing system 600. It will be apparent from this description that aspects of the inventions may be embodied, at least in part, in software. That is, the computer-implemented method 100 may be carried out in a computer system or other data processing system 510/515/600 in response to its processor or processing system 605 executing sequences of instructions contained in a memory, such as memory 610 or other non-transitory machine-readable storage medium. The software may further be transmitted or received over a network (not shown) via a network interface device 625. In various embodiments, hardwired circuitry may be used in combination with the software instructions to implement the present embodiments. Thus, the techniques are not limited to any specific combination of hardware circuitry and software, or to any particular source for the instructions executed by the data processing system 600.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing a Field-Programmable Gate Array (FPGA), Application-Specific Integrated Circuit (ASIC), a processor, a computer, or a computer system, including a networked computer system. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Blocks with dashed borders (e.g., large dashes, small dashes, dot-dash, dots) are used herein to illustrate optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method comprising:
receiving, using a hardware processor, a first plurality of actions from a first entity with respect to a first plurality of objects, wherein each of the first plurality of objects represents a distinct object within a communication system and each of the plurality of objects includes metadata for the object;
creating, in response to each of the first plurality of objects, a connection between the first entity and each of the first plurality of objects within a graph stored by the communication system;
determining a global object within the communication system related to each of the first plurality of objects, wherein the determination includes comparing the metadata for each of the first plurality of objects with a connection to the first entity within the graph, identifying metadata that is common among the first plurality of objects, and selecting the global object as being representative of the metadata identified as being common among the first plurality of objects; and
displaying, in response to the determination, a representation of the global object in association with a representation of the first entity within the communication system.

2. The computer-implemented method of claim 1, further comprising:
receiving user feedback on the representation of the global object displayed in association with the representation of the first entity;
creating, in response to the received user feedback, an instance of the global object that is unique to the first entity; and
converting the displayed representation of the global object to a representation of the instance of the global object that is unique to the first entity.

3. The computer-implemented method of claim 2, wherein creating the instance of the global object unique to the first entity comprises:
applying a selection algorithm to select a device to create the instance of the global object unique to the first entity, the selection algorithm providing all devices within the communication system a consistent method to select a same device to create the instance of the global object unique to the first entity.

4. The computer-implemented method of claim 3, wherein the selection algorithm includes selecting a server or database storing the representation of the first entity.

5. The computer-implemented method of claim 2, further comprising:
assigning a privacy setting to the instance of the global object that is unique to the first entity, wherein the privacy setting is set to a same level of privacy as an action within the first plurality of actions.

6. The computer-implemented method of claim 5, further comprising:
determining that two or more of the first plurality of actions have different privacy settings, wherein the privacy setting is a same level of privacy as a most recent action within the first plurality of actions.

7. The computer-implemented method of claim 2, further comprising:
receiving a second plurality of actions from the first entity with respect to a second plurality of objects within the communication system;
determining that the global object is related to each of the second plurality of objects; and
determining that the instance of the global object that is unique to the first entity has been created.

8. The computer-implemented method of claim 2, wherein the user feedback is received from a second entity, the second entity differing from the first entity.

9. The computer-implemented method of claim 1, wherein the first entity is a group comprised of a plurality of users and each of the plurality of users performs actions within the first plurality of actions.

10. A non-transitory computer-readable medium storing instructions which, when executed by one or more processors in a processing device, cause the processing device to perform a method comprising:
receiving a first plurality of actions from a first entity with respect to a first plurality of objects, wherein each of the first plurality of objects represents a distinct object within a communication system and each of the plurality of objects includes metadata for the object;
creating, in response to each of the first plurality of objects, a connection between the first entity and each of the first plurality of objects within a graph stored by the communication system;
determining a global object within the communication system related to each of the first plurality of objects, wherein the determination includes comparing the metadata for each of the first plurality of objects with a connection to the first entity within the graph, identifying metadata that is common among the first plurality of objects, and selecting the global object as being representative of the metadata identified as being common among the first plurality of objects; and
displaying, in response to the determination, a representation of the global object in association with a representation of the first entity within the communication system.

11. The non-transitory computer-readable medium of claim 10, the method further comprising:
receiving user feedback on the representation of the global object displayed in association with the representation of the first entity;
creating, in response to the received user feedback, an instance of the global object that is unique to the first entity; and converting the displayed representation of the global object to a representation of the instance of the global object that is unique to the first entity.

12. The non-transitory computer-readable medium of claim 11, the method further comprising:
applying a selection algorithm to select a device to create the instance of the global object unique to the first entity, the selection algorithm providing all devices within the communication system a consistent method to select a same device to create the instance of the global object unique to the first entity.

13. The non-transitory computer-readable medium of claim 12, wherein the selection algorithm includes selecting a server or database storing the representation of the first entity.

14. The non-transitory computer-readable medium of claim 11, the method further comprising:
assigning a privacy setting to the instance of the global object that is unique to the first entity, wherein the privacy setting is set to a same level of privacy as an action within the first plurality of actions.

15. The non-transitory computer-readable medium of claim 14, the method further comprising:
determining that two or more of the first plurality of actions have different privacy settings, wherein the privacy setting is a same level of privacy as a most recent action within the first plurality of actions.

16. The non-transitory computer-readable medium of claim 11, the method further comprising:
receiving a second plurality of actions from the first entity with respect to a second plurality of objects within the communication system;
determining that the global object is related to each of the second plurality of objects; and
determining that the instance of the global object that is unique to the first entity has been created.

17. The non-transitory computer-readable medium of claim 11, wherein the user feedback is received from a second entity, the second entity differing from the first entity.

18. The non-transitory computer-readable medium of claim 10, wherein the first entity is a group comprised of a plurality of users and each of the plurality of users performs actions within the first plurality of actions.

19. An apparatus comprising:
a processing device; and
a memory coupled to the processing device, the memory storing instructions which, when executed by the processing device, cause the apparatus to perform a method comprising:
receiving a first plurality of actions from a first entity with respect to a first plurality of objects, wherein each of the first plurality of objects represents a distinct object within a communication system and each of the plurality of objects includes metadata for the object;
creating, in response to each of the first plurality of objects, a connection between the first entity and each of the first plurality of objects within a graph stored by the communication system;
determining a global object within the communication system related to each of the first plurality of objects, wherein the determination includes comparing the metadata for each of the first plurality of objects with a connection to the first entity within the graph, identifying metadata that is common among the first plurality of objects, and selecting the global object as being representative of the metadata identified as being common among the first plurality of objects; and
displaying, in response to the determination, a representation of the global object in association with a representation of the first entity within the communication system.

20. The apparatus of claim 19, wherein the method further comprising:
receiving user feedback on the representation of the global object displayed in association with the representation of the first entity;
creating, in response to the received user feedback, an instance of the global object that is unique to the first entity; and
converting the displayed representation of the global object to a representation of the instance of the global object that is unique to the first entity.

* * * * *